(12) United States Patent
Chang et al.

(10) Patent No.: US 12,378,364 B2
(45) Date of Patent: Aug. 5, 2025

(54) POLYSILOXANE-POLYCARBONATE COPOLYMER USING HYDROXY-TERMINATED POLYSILOXANE MIXTURE, AND METHOD FOR PRODUCING SAME

(71) Applicant: SAMYANG CORPORATION, Seoul (KR)

(72) Inventors: Yun Ju Chang, Daejeon (KR); Kyung Moo Shin, Chilgok-gun (KR); Ki Tae Kang, Gimpo-si (KR); Mi Ran Kim, Daejeon (KR); Seung Pil Jung, Gwangju-si (KR); Jin Sik Choi, Daejeon (KR); Seong Hyen Heo, Sejong-si (KR)

(73) Assignee: SAMYANG CORPORATION, Seoul (KR)

( * ) Notice: Subject to any disclaimer, the term of this patent is extended or adjusted under 35 U.S.C. 154(b) by 531 days.

(21) Appl. No.: 17/917,278

(22) PCT Filed: Apr. 22, 2021

(86) PCT No.: PCT/KR2021/005079
§ 371 (c)(1),
(2) Date: Oct. 6, 2022

(87) PCT Pub. No.: WO2021/215838
PCT Pub. Date: Oct. 28, 2021

(65) Prior Publication Data
US 2023/0295381 A1  Sep. 21, 2023

(30) Foreign Application Priority Data
Apr. 24, 2020 (KR) ........................ 10-2020-0049940

(51) Int. Cl.
| | | |
|---|---|---|
| *C08G 77/448* | (2006.01) |
| *C08G 64/18* | (2006.01) |
| *C08G 77/458* | (2006.01) |
| *C08L 83/10* | (2006.01) |

(52) U.S. Cl.
CPC ........ *C08G 77/448* (2013.01); *C08G 64/186* (2013.01); *C08G 77/458* (2013.01); *C08L 83/10* (2013.01)

(58) Field of Classification Search
None
See application file for complete search history.

(56) References Cited

U.S. PATENT DOCUMENTS

2012/0271009 A1  10/2012  Higaki et al.
2014/0249280 A1  9/2014  Kim et al.

FOREIGN PATENT DOCUMENTS

| | | |
|---|---|---|
| JP | 2011-102364 A | 5/2011 |
| KR | 10-2013-0047332 A | 5/2013 |
| KR | 10-2013-0047612 A | 5/2013 |
| KR | 10-2016-0002486 A | 1/2016 |
| KR | 10-2020-0033366 A | 3/2020 |
| WO | WO2013/066000 A1 | 5/2013 |

OTHER PUBLICATIONS

International Search Report (PCT/ISA/210) issued in PCT/KR2021/005079 mailed on Jul. 26, 2021.

*Primary Examiner* — Marc S Zimmer
(74) *Attorney, Agent, or Firm* — Birch, Stewart, Kolasch & Birch, LLP

(57) ABSTRACT

The present invention relates to a polysiloxane-polycarbonate copolymer using a hydroxyl terminated polysiloxane mixture, and a method for producing same, and more specifically, to: a polysiloxane-polycarbonate copolymer which includes hydroxy-terminated polysiloxanes of chemical formulae 1 and 2 in a specific weight ratio as repeating units, and thus exhibits excellent transmittance and low-temperature impact strength compared to the case of using either of the hydroxy-terminated polysiloxanes by itself, and in which the overall production yield of the raw material polysiloxane is improved, such that the polysiloxane-polycarbonate copolymer is excellent in terms of economics; and a method for producing same.

13 Claims, No Drawings

POLYSILOXANE-POLYCARBONATE COPOLYMER USING HYDROXY-TERMINATED POLYSILOXANE MIXTURE, AND METHOD FOR PRODUCING SAME

TECHNICAL FIELD

The present invention relates to a polysiloxane-polycarbonate copolymer using a mixture of hydroxyl-terminated polysiloxanes and a method for preparing the same, and more specifically, a polysiloxane-polycarbonate copolymer which comprises, as repeating units, hydroxyl-terminated polysiloxanes of chemical formulas 1 and 2 within a specific weight ratio range, and thereby shows good transmittance and good impact strength at low temperature as compared with the cases comprising each of the hydroxyl-terminated polysiloxanes alone, together with improvement in entire production yield of raw material polysiloxane and the resulting advantage in economy, and a method for preparing the same.

BACKGROUND ART

Polycarbonate has good mechanical properties such as tensile strength, impact strength, etc. and good dimension stability, heat resistance and optical transparency, and thus it has been extensively used for industrial applications. However, although polycarbonate has good impact strength at room temperature, it has a weak point that the impact strength becomes rapidly lowered at low temperature.

In order to improve such a weak point, various copolymers have been continuously researched, resulting in suggestion of polysiloxane-polycarbonate copolymer (US patent publication No. 2003/0105226 A1).

Polysiloxane-polycarbonate copolymer is known to have relatively good impact strength at low temperature. However, conventional polysiloxane-polycarbonate copolymer necessarily requires a high content of siloxane in order to secure impact strength at low temperature, and such increase of siloxane content deteriorates the transparency of the polysiloxane-polycarbonate copolymer, and thus acts to limit its commercial application.

Accordingly, it is required to develop a technology which can prepare polysiloxane-polycarbonate copolymer having good transmittance and impact strength at low temperature at the same time, together with improvement in entire production yield of raw material polysiloxane and the resulting advantage in economy.

CONTENTS OF THE INVENTION

Problems to be Solved

The purpose of the present invention is to provide a polysiloxane-polycarbonate copolymer showing good transmittance and good impact strength at low temperature, together with improvement in entire production yield of raw material polysiloxane and the resulting advantage in economy, and a method for preparing the same.

Technical Means

In order to achieve the above purpose, the present invention provides a polysiloxane-polycarbonate copolymer comprising, as repeating units, a hydroxyl-terminated polysiloxane of the following chemical formula 1: a hydroxyl-terminated polysiloxane of the following chemical formula 2; and a polycarbonate block: wherein total 100 parts by weight of the hydroxyl-terminated polysiloxanes of chemical formulas 1 and 2 consists of 1 to 39 parts by weight of the hydroxyl-terminated polysiloxane of chemical formula 1 and 61 to 99 parts by weight of the hydroxyl-terminated polysiloxane of chemical formula 2:

[Chemical formula 1]

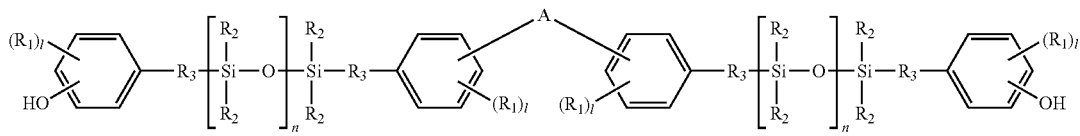

[Chemical formula 2]

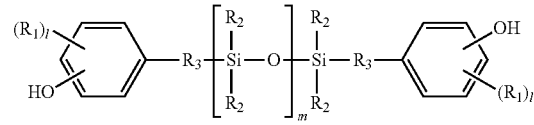

wherein: in the above chemical formulas 1 and 2,
each $R_1$ independently represents hydrogen atom, halogen atom, hydroxy group, an alkyl group, an alkoxy group, or an aryl group;
each $R_2$ independently represents a hydrocarbon group having 1 to 13 carbon atoms, or hydroxy group;
each $R_3$ independently represents an alkylene group having 2 to 8 carbon atoms;
A represents a substituted or unsubstituted divalent hydrocarbon group comprising one or more bonds selected from ester bond, ether bond, thioether bond, ketone bond or urethane bond;
l represents an integer of 0 to 4; and
each of m and n independently represents an integer of 2 to 1,000.

According to the other aspect, the present invention provides a method for preparing a polysiloxane-polycarbonate copolymer, comprising the steps of: (1) reacting a hydroxyl-terminated polysiloxane of the above chemical formula 1, a hydroxyl-terminated polysiloxane of the above chemical formula 2 and an oligomeric polycarbonate under an interfacial reaction condition to form a polysiloxane-polycarbonate intermediate; and (2) polymerizing the polysiloxane-polycarbonate intermediate by using a first polymerization catalyst; wherein total 100 parts by weight of the hydroxyl-terminated polysiloxanes of chemical formulas 1 and 2 consists of 1 to 39 parts by weight of the hydroxyl-terminated polysiloxane of chemical formula 1 and 61 to 99 parts by weight of the hydroxyl-terminated polysiloxane of chemical formula 2.

According to another aspect, the present invention provides a molded article comprising the polysiloxane-polycarbonate copolymer.

Effect of the Invention

The present invention can provide a polysiloxane-polycarbonate copolymer which shows good transmittance and good impact strength at low temperature so as to be suitably used in molded articles (for example, housing of office devices and electric/electronic products, film and sheet products, etc.), and in addition, the present invention can improve entire production yield of raw material polysiloxane and thus is advantageous in economy.

Concrete Mode for Carrying Out the Invention

The present invention is explained in more detail below.
The polysiloxane-polycarbonate copolymer of the present invention comprises, as repeating units, a hydroxyl-terminated polysiloxane of the following chemical formula 1: a hydroxyl-terminated polysiloxane of the following chemical formula 2; and a polycarbonate block: wherein total 100 parts by weight of the hydroxyl-terminated polysiloxanes of chemical formulas 1 and 2 consists of 1 to 39 parts by weight of the hydroxyl-terminated polysiloxane of chemical formula 1 and 61 to 99 parts by weight of the hydroxyl-terminated polysiloxane of chemical formula 2.

(A) Hydroxyl-Terminated Polysiloxane of Chemical Formula 1

The hydroxyl-terminated polysiloxane of the following chemical formula 1, which is comprised as a repeating unit in the polysiloxane-polycarbonate copolymer according to the present invention, is a hydroxyl-terminated polysiloxane compound having terminal hydroxyphenyl groups and comprising one or more bonds selected from ester bond, ether bond, thioether bond, ketone bond or urethane bond:

[Chemical formula 1]

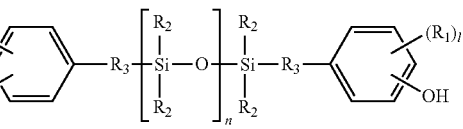

In the above chemical formula 1,
each $R_1$ independently represents hydrogen atom, halogen atom, hydroxy group, an alkyl group, an alkoxy group, or an aryl group;
each $R_2$ independently represents a hydrocarbon group having 1 to 13 carbon atoms, or hydroxy group;
each $R_3$ independently represents an alkylene group having 2 to 8 carbon atoms;
A represents a substituted or unsubstituted divalent hydrocarbon group comprising one or more bonds selected from ester bond, ether bond, thioether bond, ketone bond or urethane bond;
l represents an integer of 0 to 4; and
each n independently represents an integer of 2 to 1,000.
According to an embodiment, in the above chemical formula 1,
each $R_1$ independently represents hydrogen atom, halogen atom, hydroxy group, an alkyl group having 1 to 20 carbon atoms, an alkoxy group having 1 to 20 carbon atoms, or an aryl group having 6 to 20 carbon atoms;
each $R_2$ independently represents a hydrocarbon group having 1 to 13 carbon atoms, or hydroxy group;
each $R_3$ independently represents an alkylene group having 2 to 8 carbon atoms;
A represents

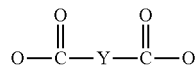

where Y is X or NH—X—NH, wherein X is a linear or branched aliphatic group having 1 to 20 carbon atoms; a cycloalkylene group having 3 to 20 carbon atoms: or a mononucleus or polynucleus arylene group having 6 to 30 carbon atoms which is unsubstituted or substituted with halogen atom, alkyl group, alkoxy group, aryl group or carboxyl group:
l represents an integer of 0 to 4; and
each n independently represents an integer of 2 to 1,000.
More concretely,
for $R_1$ in chemical formula 1, the halogen atom may be Cl or Br; the alkyl group may be an alkyl group having 1 to 13 carbon atoms, for example, methyl, ethyl or propyl: the alkoxy group may be an alkoxy group having 1 to 13 carbon atoms, for example, methoxy, ethoxy or propoxy; and the aryl group may be an aryl group having 6 to 10 carbon atoms, for example, phenyl, chlorophenyl or tolyl;
for $R_2$ in chemical formula 1, the hydrocarbon group having 1 to 13 carbon atoms may be an alkyl group having 1 to 13 carbon atoms, an alkoxy group having 1 to 13 carbon atoms, an alkenyl group having 2 to 13 carbon atoms, an alkenyloxy group having 2 to 13 carbon atoms, a cycloalkyl group having 3 to 6 carbon atoms, a cycloalkoxy group having 3 to 6 carbon atoms, an aryloxy group having 6 to 10 carbon atoms, an aralkyl group having 7 to 13 carbon atoms, an aralkoxy group having 7 to 13 carbon atoms, an alkaryl group having 7 to 13 carbon atoms, or an alkaryloxy group having 7 to 13 carbon atoms; and
in case where A in chemical formula 1 represents

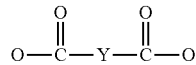

where Y is X or NH—X—NH, X may be an aliphatic group having 1 to 20 carbon atoms and being unsubstituted or substituted with halogen atom: an aliphatic group having 1 to 20 carbon atoms and comprising oxygen, nitrogen or sulfur atom in the main chain: a cycloalkylene group having 3 to 6 carbon atoms: or an arylene group which can be derived from bisphenol A, resorcinol, hydroquinone or diphenylphenol, and for example. X may be represented by one of the following chemical formulas Aa to Ah:

[Chemical formula Aa]

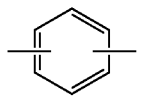

[Chemical formula Ab]

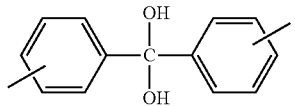

[Chemical formula Ac]

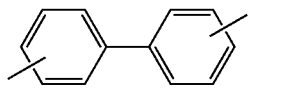

[Chemical formula Ad]

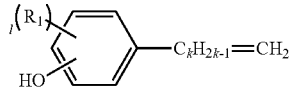

[Chemical formula Ae]

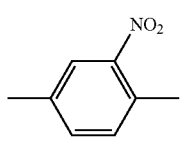

[Chemical formula Af]

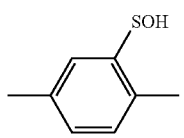

[Chemical formula Ag]

[Chemical formula Ah]

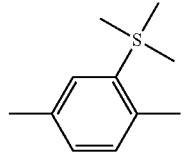

According to an embodiment, the hydroxyl-terminated polysiloxane of chemical formula 1 may be a reaction product of a hydroxyl-terminated siloxane of the following chemical formula 1a and an acyl compound (that is, a hydroxyl-terminated polysiloxane having ester bond):

[Chemical formula 1a]

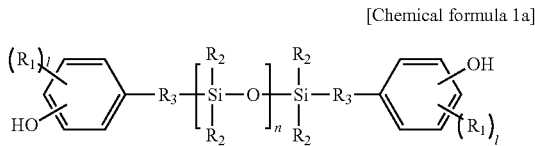

In the above chemical formula 1a, $R_1$, $R_2$, $R_3$, l, and n are the same as defined in the above chemical formula 1.

The hydroxyl-terminated siloxane of the above chemical formula 1a may be prepared, for example, by the synthesis from a compound having hydroxy group and double bond of the following chemical formula 1b and a compound containing silicon of the following chemical formula 1c with a molar ratio of 2:1, using a platinum-based catalyst:

[Chemical formula 1b]

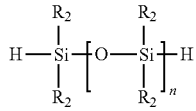

In the above chemical formula 1b, $R_1$ and l are the same as defined in the above chemical formula 1, and k represents an integer of 1 to 7.

[Chemical formula 1c]

$$H-\underset{R_2}{\overset{R_2}{Si}}-\left[O-\underset{R_2}{\overset{R_2}{Si}}\right]_n-H$$

In the above chemical formula 1c, $R_2$ and n are the same as defined in the above chemical formula 1.

The acyl compound used in preparing the hydroxyl-terminated polysiloxane of chemical formula 1 may have, for example, an aromatic structure, an aliphatic structure, or a mixed form structure comprising aromatic and aliphatic structures altogether. The acyl compound may have 6 to 30 carbon atoms if it is aromatic or mixed form, and 1 to 20 carbon atoms if it is aliphatic form. In addition, the acyl compound may further comprise halogen, oxygen, nitrogen or sulfur atom.

In another embodiment, the hydroxyl-terminated polysiloxane of chemical formula 1 may be a reaction product of a hydroxyl-terminated siloxane of the above chemical formula 1a and a polyisocyanate compound (that is, a hydroxyl-terminated polysiloxane having urethane bond).

In the above, the polyisocyanate compound may be, for example, 1,4-phenylenediisocyanate, 1,3-phenylenediisocyanate or 4,4'-methylenediphenyl diisocyanate.

According to an embodiment, in the above chemical formula 1, n may be an integer of 2 to 1,000, preferably an integer of 2 to 500, more preferably an integer of 5 to 100, even more preferably an integer of 11 to 40, and even more preferably an integer of 15 to 35. If the value of n in chemical formula 1 is too low, the impact strength at low temperature of the copolymer may deteriorate, and if the value of n is too high, the transparency of the copolymer may deteriorate.

According to an embodiment, the number average molecular weight of the polysiloxane of chemical formula 1 may be 500 to 15,000 g/mol, and preferably 3,000 to 6,000 g/mol, but it is not limited thereto.

(B) Hydroxyl-Terminated Polysiloxane of Chemical Formula 2

The hydroxyl-terminated polysiloxane of the following chemical formula 2, which is comprised as a repeating unit in the polysiloxane-polycarbonate copolymer according to the present invention, is a hydroxyl-terminated polysiloxane compound having terminal hydroxyphenyl groups:

[Chemical formula 2]

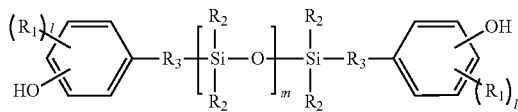

In the above chemical formula 2,
each $R_1$ independently represents hydrogen atom, halogen atom, hydroxy group, an alkyl group, an alkoxy group, or an aryl group;
each $R_2$ independently represents a hydrocarbon group having 1 to 13 carbon atoms, or hydroxy group;
each $R_3$ independently represents an alkylene group having 2 to 8 carbon atoms;
l represents an integer of 0 to 4; and
m independently represents an integer of 2 to 1,000.

According to an embodiment, in the above chemical formula 2,
each $R_1$ independently represents hydrogen atom, halogen atom, hydroxy group, an alkyl group having 1 to 20 carbon atoms, an alkoxy group having 1 to 20 carbon atoms, or an aryl group having 6 to 20 carbon atoms;
each $R_2$ independently represents a hydrocarbon group having 1 to 13 carbon atoms, or hydroxy group;
each $R_3$ independently represents an alkylene group having 2 to 8 carbon atoms;
l represents an integer of 0 to 4; and
m independently represents an integer of 2 to 1,000.

More concretely,
for $R_1$ in chemical formula 2, the halogen atom may be Cl or Br; the alkyl group may be an alkyl group having 1 to 13 carbon atoms, for example, methyl, ethyl or propyl; the alkoxy group may be an alkoxy group having 1 to 13 carbon atoms, for example, methoxy, ethoxy or propoxy; and the aryl group may be an aryl group having 6 to 10 carbon atoms, for example, phenyl, chlorophenyl or tolyl;

for $R_2$ in chemical formula 2, the hydrocarbon group having 1 to 13 carbon atoms may be an alkyl group having 1 to 13 carbon atoms, an alkoxy group having 1 to 13 carbon atoms, an alkenyl group having 2 to 13 carbon atoms, an alkenyloxy group having 2 to 13 carbon atoms, a cycloalkyl group having 3 to 6 carbon atoms, a cycloalkoxy group having 3 to 6 carbon atoms, an aryloxy group having 6 to 10 carbon atoms, an aralkyl group having 7 to 13 carbon atoms, an aralkoxy group having 7 to 13 carbon atoms, an alkaryl group having 7 to 13 carbon atoms, or an alkaryloxy group having 7 to 13 carbon atoms.

According to an embodiment, the hydroxyl-terminated polysiloxane of chemical formula 2 may be prepared, for example, by the synthesis from a compound having hydroxy group and double bond of the following chemical formula 2a and a compound containing silicon of the following chemical formula 2b with a molar ratio of 2:1, using a platinum-based catalyst:

[Chemical formula 2a]

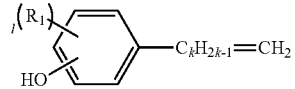

In the above chemical formula 2a, $R_1$ and l are the same as defined in the above chemical formula 2, and k represents an integer of 1 to 7.

[Chemical formula 2b]

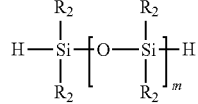

In the above chemical formula 2b, $R_2$ and m are the same as defined in the above chemical formula 2.

According to an embodiment, in the above chemical formula 2, m may be an integer of 2 to 1,000, preferably an integer of 2 to 500, more preferably an integer of 5 to 100, even more preferably an integer of 20 to 80, and even more preferably an integer of 30 to 75. If the value of m in chemical formula 2 is too low, the impact strength at low temperature of the copolymer may deteriorate, and if the value of m is too high, the transparency of the copolymer may deteriorate.

According to an embodiment, the number average molecular weight of the polysiloxane of chemical formula 2 may be 500 to 15,000 g/mol, and preferably 2,500 to 6,000 g/mol, but it is not limited thereto.

(C) Polycarbonate Block

The polysiloxane-polycarbonate copolymer according to the present invention comprises a polycarbonate block as a repeating unit, in addition to the hydroxyl-terminated polysiloxane of the above chemical formula 1 and the hydroxyl-terminated polysiloxane of the above chemical formula 2.

In an embodiment, the polycarbonate block may have a structure represented by the following chemical formula 3:

[Chemical formula 3]

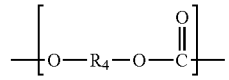

In the above chemical formula 3, $R_4$ represents an aromatic hydrocarbon group having 6 to 30 carbon atoms and being unsubstituted or substituted with alkyl group (e.g., alkyl group having 1 to 20 carbon atoms, preferably 1 to 13 carbon atoms), cycloalkyl group (e.g., cycloalkyl group having 3 to 20 carbon atoms, preferably 3 to 6 carbon atoms), alkenyl group (e.g., alkenyl group having 2 to 20 carbon atoms, preferably 2 to 13 carbon atoms), alkoxy group (e.g., alkoxy group having 1 to 20 carbon atoms, preferably 1 to 13 carbon atoms), halogen atom (e.g., Cl or Br), or nitro group.

According to an embodiment, the aromatic hydrocarbon group of $R_4$ may be derived from, for example, a compound of the following chemical formula 4:

[Chemical formula 4]

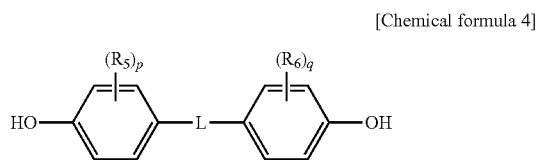

In the above chemical formula 4,

L represents a linear, branched or cyclic alkylene group having no functional group: or a linear, branched or cyclic alkylene group comprising at least one functional group selected from the group consisting of sulfide group, ether group, sulfoxide group, sulfone group, ketone group, naphthyl group or isobutylphenyl group (e.g., linear alkylene group having 1 to 10 carbon atoms, branched alkylene group having 3 to 10 carbon atoms, or cyclic alkylene group having 3 to 10 carbon atoms), each of $R_5$ and $R_6$ independently represents halogen atom (e.g., Cl or Br, etc.), or a linear, branched or cyclic alkyl group (e.g., linear alkylene group having 1 to 10 carbon atoms, branched alkylene group having 3 to 10 carbon atoms, or cyclic alkylene group having 3 to 10 carbon atoms), and each of p and q independently represents an integer of 0 to 4.

Concretely, the compound of the above chemical formula 4 may be, for example, bis(4-hydroxyphenyl) methane, bis(4-hydroxyphenyl)phenylmethane, bis(4-hydroxyphenyl) naphthylethane, bis(4-hydroxyphenyl)-(4-isobutylphenyl) methane, 1,1-bis(4-hydroxyphenyl) ethane, 1-ethyl-1,1-bis (4-hydroxyphenyl) propane, 1-phenyl-1,1-bis(4-hydroxyphenyl) ethane, 1-naphthyl-1,1-bis(4-hydroxyphenyl) ethane, 1,2-bis(4-hydroxyphenyl) ethane, 1,10-bis(4-hydroxyphenyl) decane, 2-methyl-1,1-bis(4-hydroxyphenyl) propane, 2,2-bis(4-hydroxyphenyl) propane, 2,2-bis(4-hydroxyphenyl) butane, 2,2-bis(4-hydroxyphenyl) pentane, 2,2-bis(4-hydroxyphenyl) hexane, 2,2-bis(4-hydroxyphenyl) nonane, 2,2-bis(3-methyl-4-hydroxyphenyl) propane, 2,2-bis(3-fluoro-4-hydroxyphenyl) propane, 4-methyl-2,2-bis(4-hydroxyphenyl) pentane, 4,4-bis(4-hydroxyphenyl) heptane, diphenyl-bis(4-hydroxyphenyl) methane, resorcinol, hydroquinone, 4,4'-dihydroxyphenyl ether[bis(4-hydroxyphenyl) ether], 4,4'-dihydroxy-2,5-dihydroxydiphenyl ether, 4,4'-dihydroxy-3,3'-dichlorodiphenyl ether, bis(3,5-dimethyl-4-hydroxyphenyl) ether, bis(3,5-dichloro-4-hydroxyphenyl) ether, 1,4-dihydroxy-2,5-dichlorobenzene, 1,4-dihydroxy-3-methylbenzene, 4,4'-dihydroxydiphenol[p,p'-dihydroxyphenyl], 3,3'-dichloro-4,4'-dihydroxyphenyl, 1,1-bis(4-hydroxyphenyl) cyclohexane, 1,1-bis(3,5-dimethyl-4-hydroxyphenyl) cyclohexane, 1,1-bis(3,5-dichloro-4-hydroxyphenyl) cyclohexane, 1,1-bis(3,5-dimethyl-4-hydroxyphenyl) cyclododecane, 1,1-bis(4-hydroxyphenyl)cyclododecane, 1,1-bis(4-hydroxyphenyl) butane, 1,1-bis(4-hydroxyphenyl) decane, 1,4-bis(4-hydroxyphenyl) propane, 1,4-bis(4-hydroxyphenyl) butane, 1,4-bis(4-hydroxyphenyl) isobutane, 2,2-bis(4-hydroxyphenyl) butane, 2,2-bis(3-chloro-4-hydroxyphenyl) propane, bis(3,5-dimethyl-4-hydroxyphenyl) methane, bis(3,5-dichloro-4-hydroxyphenyl) methane, 2,2-bis(3,5-dimethyl-4-hydroxyphenyl) propane, 2,2-bis(3,5-dibromo-4-hydroxyphenyl) propane, 2,2-bis(3,5-dichloro-4-hydroxyphenyl) propane, 2,4-bis(4-hydroxyphenyl)-2-methyl-butane, 4,4'-thiodiphenol[bis(4-hydroxyphenyl) sulfone], bis(3,5-dimethyl-4-hydroxyphenyl) sulfone, bis(3-chloro-4-hydroxyphenyl) sulfone, bis(4-hydroxyphenyl) sulfide, bis(4-hydroxyphenyl) sulfoxide, bis(3-methyl-4-hydroxyphenyl) sulfide, bis(3,5-dimethyl-4-hydroxyphenyl) sulfide, bis(3,5-dibromo-4-hydroxyphenyl) sulfoxide, 4,4'-dihydroxy benzophenone, 3,3',5,5'-tetramethyl-4,4'-dihydroxy benzophenone, 4,4'-dihydroxy diphenyl, methylhydroquinone, 1,5-dihydroxynaphthalene, or 2,6-dihydroxynaphthalene, but it is not limited thereto. Among them, the representative one is 2,2-bis(4-hydroxyphenyl) propane (bisphenol A). For other functional dihydric phenols, U.S. Pat. Nos. 2,999,835, 3,028,365, 3,153,008 and 3,334,154 may be referred to. The above dihydric phenol may be used alone or in combination of two or more of them.

As another monomer for the polycarbonate block, a carbonate precursor, for example, carbonyl chloride (phosgene), carbonyl bromide, bis halo formate, diphenylcarbonate, or dimethylcarbonate, etc. may be used.

(D) Polysiloxane-Polycarbonate Copolymer

The polysiloxane-polycarbonate copolymer of the present invention comprises, as repeating units, a hydroxyl-terminated polysiloxane of chemical formula 1, a hydroxyl-terminated polysiloxane of chemical formula 2 and a polycarbonate block as explained above: wherein total 100 parts by weight of the hydroxyl-terminated polysiloxanes of chemical formulas 1 and 2 consists of 1 to 39 parts by weight of the hydroxyl-terminated polysiloxane of chemical formula 1 and 61 to 99 parts by weight of the hydroxyl-terminated polysiloxane of chemical formula 2.

In total 100 parts by weight of the hydroxyl-terminated polysiloxanes of chemical formulas 1 and 2, if the amount of the polysiloxane of chemical formula 1 is less than 1 part by weight (or if the amount of the polysiloxane of chemical formula 2 is greater than 99 parts by weight), the transparency of the resulting copolymer may deteriorate, and in contrast, if the amount of the polysiloxane of chemical formula 1 is greater than 39 parts by weight (or if the amount of the polysiloxane of chemical formula 2 is less than 61 parts by weight), the entire production yield of polysiloxane may be lowered.

In an embodiment, in total 100 parts by weight of the hydroxyl-terminated polysiloxanes of chemical formulas 1 and 2, the amount of the polysiloxane of chemical formula 1 may be 1.5 parts by weight or more, 2 parts by weight or more, 2.5 parts by weight or more, 3 parts by weight or more, 3.5 parts by weight or more, 4 parts by weight or more, 4.5 parts by weight or more or 5 parts by weight or more, and 38 parts by weight or less, 37 parts by weight or less, 36 parts by weight or less, 35 parts by weight or less, 34 parts by weight or less, 33 parts by weight or less, 32 parts by weight or less, 31 parts by weight or less or 30 parts by weight or less.

In an embodiment, in total 100 parts by weight of the hydroxyl-terminated polysiloxanes of chemical formulas 1 and 2, the amount of the polysiloxane of chemical formula 2 may be 62 parts by weight or more, 63 parts by weight or more, 64 parts by weight or more, 65 parts by weight or more, 66 parts by weight or more, 67 parts by weight or more, 68 parts by weight or more, 69 parts by weight or more or 70 parts by weight or more, and 98.5 parts by weight or less, 98 parts by weight or less, 97.5 parts by weight or less, 97 parts by weight or less, 96.5 parts by weight or less, 96 parts by weight or less, 95.5 parts by weight or less or 95 parts by weight or less.

In an embodiment, the sum of amounts of the polysiloxanes of chemical formulas 1 and 2 comprised in the polysiloxane-polycarbonate copolymer of the present invention as repeating units may be, based on the total weight of the copolymer, 3 to 39% by weight, more concretely 4 to 30% by weight, even more concretely 4 to 25% by weight, and even more concretely 4 to 20% by weight. If the sum of amounts of the polysiloxanes of chemical formulas 1 and 2 based on the total weight of the copolymer is less than 3% by weight, the impact strength at low temperature of the copolymer may deteriorate, and if it is greater than 39% by weight, the flowability of the copolymer may deteriorate and thus extrusion or injection processing may become difficult.

In an embodiment, the viscosity average molecular weight of the polysiloxane-polycarbonate copolymer according to the present invention may be 13,000 to 69,000 g/mol, more concretely 14,000 to 65,000 g/mol, even more concretely 15,000 to 60,000 g/mol, even more concretely 16,000 to 55,000 g/mol, even more concretely 16,000 to 50,000 g/mol, and even more concretely 16,000 to 45,000 g/mol. If the viscosity average molecular weight of the copolymer is too low, the mechanical properties including impact strength at low temperature, etc. may deteriorate, and if the viscosity average molecular weight of the copolymer is too high, the flowability of the copolymer may deteriorate and thus extrusion or injection processing may become difficult.

In an embodiment, the amount of the polycarbonate block in the polysiloxane-polycarbonate copolymer of the present invention may be, based on the total weight of the copolymer, 61 to 97% by weight, more concretely 70 to 96% by weight, even more concretely 75 to 96% by weight, and even more concretely 80 to 96% by weight. If the amount of the polycarbonate block is less than 61% by weight, the transparency and processability of the copolymer may deteriorate, and if the amount of the polycarbonate block is greater than 97% by weight, the impact strength at low temperature of the copolymer may deteriorate.

The polysiloxane-polycarbonate copolymer of the present invention may be prepared by a method comprising the steps of (1) reacting a hydroxyl-terminated polysiloxane of the above chemical formula 1, a hydroxyl-terminated polysiloxane of the above chemical formula 2 and an oligomeric polycarbonate under an interfacial reaction condition to form a polysiloxane-polycarbonate intermediate; and (2) polymerizing the polysiloxane-polycarbonate intermediate by using a first polymerization catalyst: wherein total 100 parts by weight of the hydroxyl-terminated polysiloxanes of chemical formulas 1 and 2 consists of 1 to 39 parts by weight of the hydroxyl-terminated polysiloxane of chemical formula 1 and 61 to 99 parts by weight of the hydroxyl-terminated polysiloxane of chemical formula 2.

In an embodiment, the above step (1) of forming a polysiloxane-polycarbonate intermediate may comprise a step of mixing a mixture of the polysiloxane of chemical formula 1 and polysiloxane of chemical formula 2, and the oligomeric polycarbonate with a weight ratio of 3:97 to 39:61, more concretely 4:96 to 30:70, even more concretely 4:96 to 25:75, and even more concretely 4:96 to 20:80.

In an embodiment, the oligomeric polycarbonate used in preparing the polysiloxane-polycarbonate copolymer according to the present invention may have a viscosity average molecular weight of 800 to 20,000 g/mol, and more concretely 1,000 to 15,000 g/mol. If the viscosity average molecular weight of the oligomeric polycarbonate is less than 800, the molecular weight distribution of the copolymer may be broad and and its properties may deteriorate, and it is greater than 20,000, the reactivity may be lowered.

In an embodiment, the oligomeric polycarbonate may be prepared by adding the above-explained dihydric phenol compound in an aqueous alkaline solution to make it in a phenol salt state, and then adding the phenol compound in a phenol salt state to dichloromethane containing injected phosgene gas for reaction. To prepare the oligomer, it is preferable to maintain the molar ratio of phosgene to dihydric phenol compound (e.g., bisphenol A) within a range of about 1:1 to 1.5:1, and more preferably 1:1 to 1.2:1. If the molar ratio of phosgene to dihydric phenol compound is less than 1, the reactivity may be lowered, and if the molar ratio of phosgene to dihydric phenol compound is greater than 1.5, the molecular weight increases excessively and thus the processability may be problematic.

The above reaction of forming polycarbonate oligomer may generally be conducted at a temperature range of about 15 to 60° C., and in order to adjust the pH of the reaction mixture, alkali metal hydroxide (e.g., sodium hydroxide) may be used.

In an embodiment, the above step (1) of forming a polysiloxane-polycarbonate intermediate comprises a step of forming a mixture comprising the polysiloxane of chemical formula 1, the polysiloxane of chemical formula 2 and the oligomeric polycarbonate; and the mixture may further comprise a phase transfer catalyst, a molecular weight-controlling agent and a second polymerization catalyst.

In an embodiment, the above step (1) of forming a polysiloxane-polycarbonate intermediate comprises a step of forming a mixture comprising the polysiloxane of chemical formula 1, the polysiloxane of chemical formula 2 and the oligomeric polycarbonate; and after completion of the reaction of the polysiloxanes of formulas 1 and 2 and the oligomeric polycarbonate; and a step of extracting an organic phase from the resulting mixture, and the above step (2) of polymerizing the polysiloxane-polycarbonate intermediate may comprise a step of providing a first polymerization catalyst to the extracted organic phase.

Concretely, the polysiloxane-polycarbonate copolymer according to the present invention may be prepared by adding the polysiloxanes of formulas 1 and 2 to a mixture of organic phase-aqueous phase containing the oligomeric polycarbonate, and subsequently feeding a molecular weight-controlling agent and a catalyst.

As the molecular weight-controlling agent, a monofunctional compound similar to a monomer used in preparation of polycarbonate may be used. The monofunctional compound may be, for example, a derivative based on phenol such as p-isopropylphenol, p-tert-butylphenol (PTBP), p-cumylphenol, p-isooctylphenol and p-isononylphenol, or an aliphatic alcohol. Preferably, p-tert-butylphenol (PTBP) may be used.

As the catalyst, a polymerization catalyst and/or a phase transfer catalyst may be used. The polymerization catalyst may be, for example, triethylamine (TEA), and the phase transfer catalyst may be a compound of the following chemical formula 5:

($R_7$)$_4$Q$^4$X$^-$ [Chemical formula 5]

In the above chemical formula 5, $R_7$ represents an alkyl group having 1 to 10 carbon atoms: Q represents nitrogen or phosphorus; and X represents halogen atom or —OR$_8$, wherein R$_8$ represents hydrogen atom, an alkyl group having 1 to 18 carbon atoms or an aryl group having 6 to 18 carbon atoms.

Concretely, the phase transfer catalyst may be, for example, [CH$_3$(CH$_2$)$_3$]$_4$NX, [CH$_3$(CH$_2$)$_3$]$_4$PX, [CH$_3$(CH$_2$)$_6$]$_4$NX, [CH$_3$(CH$_2$)$_6$]$_4$NX, [CH$_3$(CH$_2$)$_4$]$_4$NX, CH$_3$[CH$_3$(CH$_2$)$_3$]$_3$NX or CH$_3$[CH$_3$(CH$_2$)$_2$]$_3$NX, wherein X represents Cl, Br or —OR$_9$ where R$_9$ represents hydrogen atom, an alkyl group having 1 to 18 carbon atoms or an aryl group having 6 to 18 carbon atoms.

The amount of the phase transfer catalyst is preferably about 0.01 to 10% by weight based on the total weight of the mixture of the polysiloxanes of chemical formulas 1 and 2 and the oligomeric polycarbonate. If the amount of the phase transfer catalyst is less than 0.01% by weight, the reactivity may be lowered, and if its amount is greater than 10% by weight, the phase transfer catalyst may be precipitated or the transparency may deteriorate.

In a preferable embodiment, after the polysiloxane-polycarbonate copolymer is prepared, the organic phase dispersed in methylene chloride is washed with alkali and then separated. Subsequently, the organic phase is washed with 0.1 N solution of hydrochloric acid and then rinsed with distilled water 2 or 3 times. After rinsing is completed, the concentration of the organic phase dispersed in methylene chloride is adjusted constantly and granulation is conducted by using a constant amount of pure water at a temperature ranging from 70 to 80° C. If the temperature of the pure water is lower than 70° C., the granulation rate is low and thus the granulation time may be too long. If the temperature of the pure water is higher than 80° C., it may be difficult to obtain the polycarbonate in uniformly sized morphology. After granulation is completed, it is preferable to dry the product at 100 to 110° C. for 5 to 10 hours first, and then at 110 to 120° C. for 5 to 10 hours.

The polysiloxane-polycarbonate copolymer according to the present invention has good transparency and good impact strength at low temperature at the same time, and thus can be used suitably in production of housing of office devices and electric/electronic products, film and sheet products, etc.

Thus, according to another aspect of the present invention, a molded article comprising the polysiloxane-polycarbonate copolymer of the present invention is provided.

There is no special limitation in a method for producing a molded article by processing the polysiloxane-polycarbonate copolymer of the present invention, and a method generally used in plastic molding may be employed to produce the molded article.

The present invention is explained in more detail through the following Examples and Comparative Examples. However, the scope of the present invention is not limited thereby in any manner.

EXAMPLES

<Preparation of Hydroxyl-Terminated Polysiloxane>

Preparation Example 1: Preparation of Hydroxyl-Terminated Polysiloxane of Chemical Formula 1 Having Ester Bond In a 100 mL three-necked flask equipped with a condenser, under nitrogen atmosphere, 0.03 mol of 2-allylphenol and 0.015 mol of hydride-terminated polydimethylsiloxane were completely dissolved in 50 mL of chlorobenzene, and then 0.00364 mmol of platinum-based catalyst (platinum (0)-1,3-divinyl-1,1,3,3-tetramethyldisiloxane complex) was added thereto and the mixture was refluxed for 24 hours. Then, the solvent of the solution after the reaction was removed, and the product was washed with distilled water, and dried in a vacuum oven for 24 hours to prepare a hydroxyl-terminated polysiloxane of the following chemical formula A. At that time, through the control of the number average molecular weight of the hydride-terminated polydimethylsiloxane, hydroxyl-terminated polysiloxanes of the following chemical formula A having various number average molecular weights were prepared.

In a 500 mL three-necked flask equipped with a condenser, under nitrogen atmosphere, 0.04 mol of the obtained hydroxyl-terminated polysiloxane of the following chemical formula A was dissolved in 300 mL of chloroform, and 67 mL of trimethylamine (TEA) was added thereto. Under the state of refluxing the solution, 0.020 mol of terephthaloyl chloride dissolved in 100 mL of chloroform was slowly added to the solution for 1 hour, and the resulting mixture was refluxed for 12 hours. Then, the solvent of the solution after the reaction was removed, and the product was dissolved in acetone and washed with hot distilled water, and dried in a vacuum oven for 24 hours to prepare a hydroxyl-terminated polysiloxane of the following chemical formula B having ester bond.

[Chemical formula A]

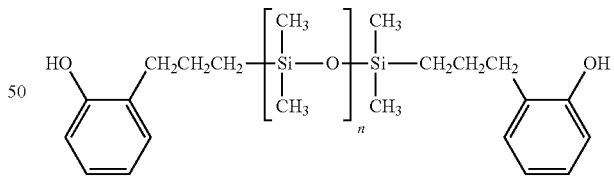

[Chemical formula B]

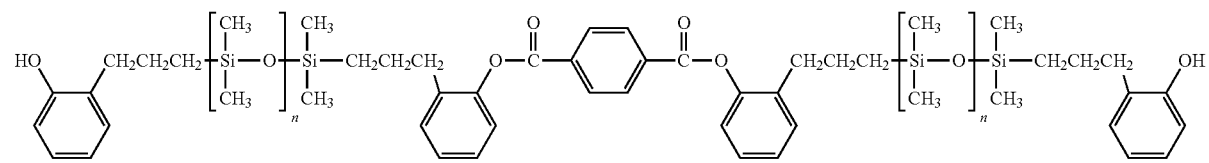

In the above chemical formulas A and B, each n independently represents an integer of 15 to 34.

Preparation Example 2: Preparation of Hydroxyl-Terminated Polysiloxane of Chemical Formula 2

In a 100 mL three-necked flask equipped with a condenser, under nitrogen atmosphere, 0.03 mol of 2-allylphenol and 0.015 mol of hydride-terminated polydimethylsiloxane were completely dissolved in 50 mL of chlorobenzene, and then 0.00364 mmol of platinum-based catalyst (platinum (0)-1,3-divinyl-1,1,3,3-tetramethyldisiloxane complex) was added thereto and the mixture was refluxed for 24 hours. Then, the solvent of the solution after the reaction was removed, and the product was washed with distilled water, and dried in a vacuum oven for 24 hours to prepare a hydroxyl-terminated polysiloxane of the following chemical formula C. At that time, through the control of the number average molecular weight of the hydride-terminated polydimethylsiloxane, hydroxyl-terminated polysiloxanes of the following chemical formula C having various number average molecular weights were prepared.

polydimethylsiloxane, hydroxyl-terminated polysiloxanes of the following chemical formula D having various number average molecular weights were prepared.

In a 500 mL three-necked flask equipped with a condenser, under nitrogen atmosphere, 0.04 mol of the obtained hydroxyl-terminated polysiloxane of the following chemical formula D was dissolved in 200 mL of chloroform to prepare solution. Under the state of refluxing the solution, 0.02 mol of 1,4-phenylenediisocyanate dissolved in 50 mL of chloroform was slowly added to the solution maintained at 60° C. for 1 hour by using a dropping funnel. After adding a small amount of triethylenediamine (TEDA) to the mixture solution, the resulting mixture was refluxed for 24 hours. Then, the solvent of the solution after the reaction was removed, and the product was washed with hot distilled water, and dried in a vacuum oven for 24 hours to prepare a hydroxyl-terminated polysiloxane of the following chemical formula E having urethane bond.

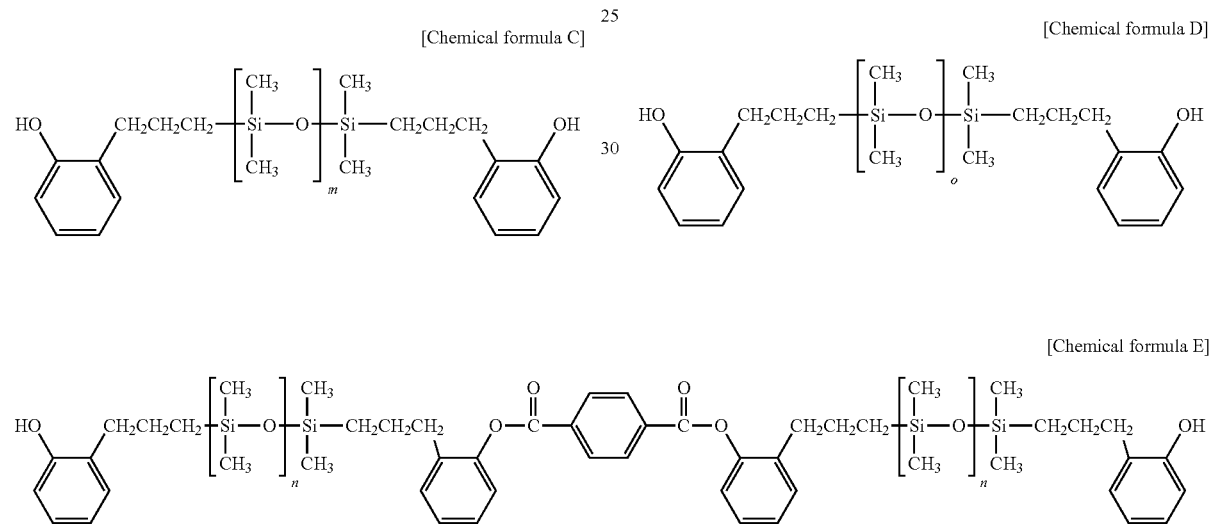

[Chemical formula C]

[Chemical formula D]

[Chemical formula E]

In the above chemical formula C, m represents an integer of 30 to 70.

Preparation Example 3: Preparation of Hydroxyl-Terminated Polysiloxane of Chemical Formula 1 Having Urethane Bond In a 100 mL three-necked flask equipped with a condenser, under nitrogen atmosphere, 0.08 mol of 2-allylphenol and 0.04 mol of hydride-terminated polydimethylsiloxane were completely dissolved in 50 mL of chlorobenzene, and then 0.00364 mmol of platinum-based catalyst (platinum (0)-1,3-divinyl-1,1,3,3-tetramethyldisiloxane complex) was added thereto and the mixture was refluxed for 24 hours. Then, the solvent of the solution after the reaction was removed, and the product was washed with distilled water, and dried in a vacuum oven for 24 hours to prepare a hydroxyl-terminated polysiloxane of the following chemical formula D. At that time, through the control of the number average molecular weight of the hydride-terminated In the above chemical formulas D and E, each o independently represents an integer of 15 to 34.

<Preparation of Polysiloxane-Polycarbonate Copolymer>

Example 1

An interfacial reaction of bisphenol A in an aqueous solution and phosgene gas was conducted in the presence of methylene chloride to prepare 1L of an oligomeric polycarbonate mixture having a viscosity average molecular weight of about 1,000 g/mol. The polysiloxane of chemical formula B (n=30) obtained in Preparation Example 1 and the polysiloxane of chemical formula C (m=35) obtained in Preparation Example 2 dissolved in methylene chloride were mixed with 10:90 weight ratio to prepare a polysiloxane mixture (5% by weight of the polysiloxane mixture based on the total weight of the copolymer), and the polysiloxane mixture, 1.8 mL of tetrabutylammonium chloride (TBACl), 2.61 g of p-tert-butylphenol (PTBP) and 186 µL of trimethylamine (TEA) were mixed with the above-obtained oligomeric polycarbonate mixture, and the reaction was conducted for 30 minutes. The resulting reaction mixture was set to allow phase separation, and only the organic phase was collected therefrom, and mixed with 170 g of an aqueous solution of sodium hydroxide, 370 g of methylene chloride and 23 μL of trimethylamine, and then the reaction was conducted for 2 hours. After the phase separation, water is added to the organic phase with increased viscosity and the mixture was separated. Next, the resulting organic phase was washed with 0.1N hydrochloric acid solution and then rinsed with distilled water 2 to 3 times. After the rinsing was completed, the organic phase with a constant concentration was solidified by using a constant amount of pure water at 76° C. After the solidification was completed, the product was dried first at 110° C. for 8 hours and then at 120° C. for 10 hours to prepare a polysiloxane-polycarbonate copolymer. The properties of the prepared polysiloxane-polycarbonate copolymer were measured and are shown in the following Table 1.

Example 2

A polysiloxane-polycarbonate copolymer was prepared by the same method as described in Example 1, except that the number average molecular weight of the polysiloxane of chemical formula B obtained in Preparation Example 1, the number average molecular weight of the polysiloxane of chemical formula C obtained in Preparation Example 2, the weight ratio of the polysiloxane of chemical formula B obtained in Preparation Example 1 and the polysiloxane of chemical formula C obtained in Preparation Example 2, and the amount of the mixture of the polysiloxane of chemical formula B obtained in Preparation Example 1 and the polysiloxane of chemical formula C obtained in Preparation Example 2 were changed as shown in the following Table 1. The properties of the prepared polysiloxane-polycarbonate copolymer were measured and are shown in the following Table 1.

Example 3

A polysiloxane-polycarbonate copolymer was prepared by the same method as described in Example 1, except that the number average molecular weight of the polysiloxane of chemical formula B obtained in Preparation Example 1, the number average molecular weight of the polysiloxane of chemical formula C obtained in Preparation Example 2, and the weight ratio of the polysiloxane of chemical formula B obtained in Preparation Example 1 and the polysiloxane of chemical formula C obtained in Preparation Example 2, and the amount of the mixture of the polysiloxane of chemical formula B obtained in Preparation Example 1 and the polysiloxane of chemical formula C obtained in Preparation Example 2 were changed as shown in the following Table 1. The properties of the prepared polysiloxane-polycarbonate copolymer were measured and are shown in the following Table 1.

Example 4

A polysiloxane-polycarbonate copolymer was prepared by the same method as described in Example 1, except that the number average molecular weight of the polysiloxane of chemical formula B obtained in Preparation Example 1, the number average molecular weight of the polysiloxane of chemical formula C obtained in Preparation Example 2, the weight ratio of the polysiloxane of chemical formula B obtained in Preparation Example 1 and the polysiloxane of chemical formula C obtained in Preparation Example 2, and the amount of the mixture of the polysiloxane of chemical formula B obtained in Preparation Example 1 and the polysiloxane of chemical formula C obtained in Preparation Example 2 were changed as shown in the following Table 1, and the amount of p-tert-butylphenol was changed from 2.61 g to 1.86 g. The properties of the prepared polysiloxane-polycarbonate copolymer were measured and are shown in the following Table 1.

Example 5

A polysiloxane-polycarbonate copolymer was prepared by the same method as described in Example 1, except that the number average molecular weight of the polysiloxane of chemical formula B obtained in Preparation Example 1, the number average molecular weight of the polysiloxane of chemical formula C obtained in Preparation Example 2, the weight ratio of the polysiloxane of chemical formula B obtained in Preparation Example 1 and the polysiloxane of chemical formula C obtained in Preparation Example 2, and the amount of the mixture of the polysiloxane of chemical formula B obtained in Preparation Example 1 and the polysiloxane of chemical formula C obtained in Preparation Example 2 were changed as shown in the following Table 1, and the amount of p-tert-butylphenol was changed from 2.61 g to 1.49 g. The properties of the prepared polysiloxane-polycarbonate copolymer were measured and are shown in the following Table 1.

Example 6

A polysiloxane-polycarbonate copolymer was prepared by the same method as described in Example 1, except that the number average molecular weight of the polysiloxane of chemical formula B obtained in Preparation Example 1, the number average molecular weight of the polysiloxane of chemical formula C obtained in Preparation Example 2, the weight ratio of the polysiloxane of chemical formula B obtained in Preparation Example 1 and the polysiloxane of chemical formula C obtained in Preparation Example 2, and the amount of the mixture of the polysiloxane of chemical formula B obtained in Preparation Example 1 and the polysiloxane of chemical formula C obtained in Preparation Example 2 were changed as shown in the following Table 1, and the amount of p-tert-butylphenol was changed from 2.61 g to 3.36 g. The properties of the prepared polysiloxane-polycarbonate copolymer were measured and are shown in the following Table 1.

Example 7

A polysiloxane-polycarbonate copolymer was prepared by the same method as described in Example 1, except that the number average molecular weight of the polysiloxane of chemical formula B obtained in Preparation Example 1, the number average molecular weight of the polysiloxane of chemical formula C obtained in Preparation Example 2, the weight ratio of the polysiloxane of chemical formula B obtained in Preparation Example 1 and the polysiloxane of chemical formula C obtained in Preparation Example 2, and the amount of the mixture of the polysiloxane of chemical formula B obtained in Preparation Example 1 and the polysiloxane of chemical formula C obtained in Preparation Example 2 were changed as shown in the following Table 1, and the amount of p-tert-butylphenol was changed from 2.61 g to 2.98 g. The properties of the prepared polysiloxane-polycarbonate copolymer were measured and are shown in the following Table 1.

Example 8

An interfacial reaction of bisphenol A in an aqueous solution and phosgene gas was conducted in the presence of methylene chloride to prepare 1L of an oligomeric polycarbonate mixture having a viscosity average molecular weight of about 1,000 g/mol. The polysiloxane of chemical formula E (0=30) obtained in Preparation Example 3 and the polysiloxane of chemical formula C (m=35) obtained in Preparation Example 2 dissolved in methylene chloride were mixed with 10:90 weight ratio to prepare a polysiloxane mixture (5% by weight of the polysiloxane mixture based on the total weight of the copolymer), and the polysiloxane mixture, 1.8 mL of tetrabutylammonium chloride (TBACl), 2.61 g of p-tert-butylphenol (PTBP) and 186 μL of trimethylamine (TEA) were mixed with the above-obtained oligomeric polycarbonate mixture, and the reaction was conducted for 30 minutes. The resulting reaction mixture was set to allow phase separation, and only the organic phase was collected therefrom, and mixed with 170 g of an aqueous solution of sodium hydroxide, 370 g of methylene chloride and 23 μL of trimethylamine, and then the reaction was conducted for 2 hours. After the phase separation, water is added to the organic phase with increased viscosity and the mixture was separated. Next, the resulting organic phase was washed with 0.1N hydrochloric acid solution and then rinsed with distilled water 2 to 3 times. After the rinsing was completed, the organic phase with a constant concentration was solidified by using a constant amount of pure water at 76° C. After the solidification was completed, the product was dried first at 110° C. for 8 hours and then at 120° C. for 10 hours to prepare a polysiloxane-polycarbonate copolymer. The properties of the prepared polysiloxane-polycarbonate copolymer were measured and are shown in the following Table 1.

Example 9

A polysiloxane-polycarbonate copolymer was prepared by the same method as described in Example 8, except that the number average molecular weight of the polysiloxane of chemical formula E obtained in Preparation Example 3, the number average molecular weight of the polysiloxane of chemical formula C obtained in Preparation Example 2, the weight ratio of the polysiloxane of chemical formula E obtained in Preparation Example 3 and the polysiloxane of chemical formula C obtained in Preparation Example 2, and the amount of the mixture of the polysiloxane of chemical formula E obtained in Preparation Example 3 and the polysiloxane of chemical formula C obtained in Preparation Example 2 were changed as shown in the following Table 1, and the amount of p-tert-butylphenol was changed from 2.61 g to 3.12 g. The properties of the prepared polysiloxane-polycarbonate copolymer were measured and are shown in the following Table 1.

TABLE 1

| | Examples | | | | | | | | |
|---|---|---|---|---|---|---|---|---|---|
| | 1 | 2 | 3 | 4 | 5 | 6 | 7 | 8 | 9 |
| n of formula B in Preparation Example 1 | 30 | 15 | 20 | 17 | 34 | 26 | 30 | — | — |
| m of formula C in Preparation Example 2 | 35 | 40 | 70 | 60 | 30 | 50 | 55 | 35 | 40 |
| o of formula E in Preparation Example 3 | — | — | — | — | — | — | — | 30 | 15 |
| Amount of polysiloxane of formula B in 100 parts by weight of the total polysiloxane (parts by weight) | 10 | 5 | 20 | 30 | 3 | 10 | 7 | — | — |
| Amount of polysiloxane of formula E in 100 parts by weight of the total polysiloxane (parts by weight) | — | — | — | — | — | — | — | 10 | 5 |
| Amount of polysiloxane of formula C in 100 parts by weight of the total polysiloxane (parts by weight) | 90 | 95 | 80 | 70 | 97 | 90 | 93 | 90 | 95 |
| Amount of sum of polysiloxanes in the copolymer (% by weight) | 5 | 20 | 4 | 5 | 10 | 17 | 10 | 5 | 10 |
| Viscosity average molecular weight (Mv) (g/mol) | 27,000 | 29,300 | 25,800 | 35,200 | 43,800 | 16,300 | 21,700 | 27,800 | 19,800 |
| Entire production yield of polysiloxane (%) | 93 | 95 | 92 | 90 | 95 | 92 | 93 | 91 | 93 |
| Transmittance of the copolymer (%) | 94 | 91 | 90 | 88 | 93 | 90 | 87 | 93 | 90 |
| Impact strength at low temperature of the copolymer (kgr cm/cm) | 70 Ductile | 75 Ductile | 70 Ductile | 70 Ductile | 75 Ductile | 78 Ductile | 73 Ductile | 75 Ductile | 70 Ductile |

Comparative Example 1

A polysiloxane-polycarbonate copolymer was prepared by the same method as described in Example 1, except that the number average molecular weight of the polysiloxane of chemical formula B obtained in Preparation Example 1, the number average molecular weight of the polysiloxane of chemical formula C obtained in Preparation Example 2, the weight ratio of the polysiloxane of chemical formula B obtained in Preparation Example 1 and the polysiloxane of chemical formula C obtained in Preparation Example 2, and the amount of the mixture of the polysiloxane of chemical formula B obtained in Preparation Example 1 and the polysiloxane of chemical formula C obtained in Preparation Example 2 were changed as shown in the following Table 2, and the amount of p-tert-butylphenol was changed from 2.61 g to 1.49 g. The properties of the prepared polysiloxane-polycarbonate copolymer were measured and are shown in the following Table 2.

Comparative Example 2

A polysiloxane-polycarbonate copolymer was prepared by the same method as described in Example 1, except that the number average molecular weight of the polysiloxane of chemical formula B obtained in Preparation Example 1, the number average molecular weight of the polysiloxane of chemical formula C obtained in Preparation Example 2, the weight ratio of the polysiloxane of chemical formula B obtained in Preparation Example 1 and the polysiloxane of chemical formula C obtained in Preparation Example 2, and the amount of the mixture of the polysiloxane of chemical formula B obtained in Preparation Example 1 and the polysiloxane of chemical formula C obtained in Preparation Example 2 were changed as shown in the following Table 2, and the amount of p-tert-butylphenol was changed from 2.61 g to 1.86 g. The properties of the prepared polysiloxane-polycarbonate copolymer were measured and are shown in the following Table 2.

TABLE 2

|  | Comparative Examples | | | |
|---|---|---|---|---|
|  | 1 | 2 | 3 | 4 |
| n of formula B in Preparation Example 1 | — | 34 | 30 | 15 |
| m of formula C in Preparation Example 2 | 70 | — | 70 | 60 |
| Amount of polysiloxane of formula B in 100 parts by weight of the total polysiloxane (parts by weight) | — | 100 | 0.5 | 40 |
| Amount of polysiloxane of formula C in 100 parts by weight of the total polysiloxane (parts by weight) | 100 | — | 99.5 | 60 |
| Amount of sum of polysiloxanes in the copolymer (% by weight) | 20 | 10 | 20 | 2 |
| Viscosity average molecular weight (Mv) (g/mol) | 42,100 | 21,500 | 22,300 | 34,800 |
| Entire production yield of polysiloxane (%) | 96 | 81 | 96 | 88 |
| Transmittance of the copolymer (%) | 82 | 93 | 83 | 82 |
| Impact strength at low temperature of the copolymer (kgr cm/cm) | 75 Ductile | 72 Ductile | 73 Ductile | 15 Brittle | polysiloxane of chemical formula C obtained in Preparation Example 2 were changed as shown in the following Table 2, and the amount of p-tert-butylphenol was changed from 2.61 g to 2.98 g. The properties of the prepared polysiloxane-polycarbonate copolymer were measured and are shown in the following Table 2.

Comparative Example 3

A polysiloxane-polycarbonate copolymer was prepared by the same method as described in Example 1, except that the number average molecular weight of the polysiloxane of chemical formula B obtained in Preparation Example 1, the number average molecular weight of the polysiloxane of chemical formula C obtained in Preparation Example 2, the weight ratio of the polysiloxane of chemical formula B obtained in Preparation Example 1 and the polysiloxane of chemical formula C obtained in Preparation Example 2, and the amount of the mixture of the polysiloxane of chemical formula B obtained in Preparation Example 1 and the polysiloxane of chemical formula C obtained in Preparation Example 2 were changed as shown in the following Table 2, and the amount of p-tert-butylphenol was changed from 2.61 g to 2.95 g. The properties of the prepared polysiloxane-polycarbonate copolymer were measured and are shown in the following Table 2.

Comparative Example 4

A polysiloxane-polycarbonate copolymer was prepared by the same method as described in Example 1, except that the number average molecular weight of the polysiloxane of chemical formula B obtained in Preparation Example 1, the number average molecular weight of the polysiloxane of chemical formula C obtained in Preparation Example 2, the weight ratio of the polysiloxane of chemical formula B obtained in Preparation Example 1 and the polysiloxane of chemical formula C obtained in Preparation Example 2, and the amount of the mixture of the polysiloxane of chemical formula B obtained in Preparation Example 1 and the The properties in the above Tables 1 and 2 were measure by the following methods.

1) The entire production yield of polysiloxane was calculated by the following equation:

[Total weight of the actually prepared polysiloxane (g)/Total weight of theoretically obtained polysiloxane (g)]×100 (%)=Entire production yield of polysiloxane (%)

2) Viscosity average molecular weight (Mv (g/mol)): The viscosity of methylene chloride solution was measured by using an Ubbelohde Viscometer at 20° C., and the limiting viscosity[η] therefrom was calculated according to the following equation.

$[\eta] = 1.23 \times 10^{-5} M_v^{0.83}$

3) Transmittance (%): The transmittance was measured by using a haze meter (HAZE-GARD PLUS, BYK GARDNER).

4) Impact strength at low temperature: The impact strength at low temperature was evaluated according to ASTM D256 for a notched sample under a low temperature condition of −40° C. Concretely, for each sample, the impact strength at low temperature was measured 10 times, and the average value of the 10 measurement results was calculated.

Ductile: The sample was not separated when the impact strength at low temperature was measured.

Brittle: The sample was separated when the impact strength at low temperature was measured.

As shown in the above Table 1, the copolymers of Examples 1 to 9 showed good transparency with 85% or higher of tranmittance, very good entire production yield of polysiloxane of 90% or higher, and also good impact strength at low temperature.

However, the copolymer of Comparative Example 1 using the polysiloxane of chemical formula 2 alone as polysiloxane showed poor transparency with 82% of tranmittance, and the copolymer of Comparative Example 2 using the polysiloxane of chemical formula 1 alone as polysiloxane showed poor entire production yield of polysiloxane of 81%.

In addition, even in case of using a mixture of the polysiloxane of chemical formula 1 and the polysiloxane of chemical formula 2 as polysiloxane, the copolymer of Comparative Example 3 showed poor transparency with 83% of tranmittance, and the copolymer of Comparative Example 4 showed poor entire production yield of polysiloxane and transparency, and in particular, very poor impact strength at low temperature.

The invention claimed is:

1. A polysiloxane-polycarbonate copolymer comprising:
   as repeating units, a hydroxyl-terminated polysiloxane of the following chemical formula 1; a hydroxyl-terminated polysiloxane of the following chemical formula 2; and a polycarbonate block;
   wherein total 100 parts by weight of the hydroxyl-terminated polysiloxanes of chemical formulas 1 and 2 consists of 1 to 39 parts by weight of the hydroxyl-terminated polysiloxane of chemical formula 1 and 61 to 99 parts by weight of the hydroxyl-terminated polysiloxane of chemical formula 2:

A represents

where Y is X or NH—X—NH, wherein X is a linear or branched aliphatic group having 1 to 20 carbon atoms; a cycloalkylene group having 3 to 20 carbon atoms; or a mononucleus or polynucleus arylene group having 6 to 30 carbon atoms which is unsubstituted or substituted with halogen atom, alkyl group, alkoxy group, aryl group or carboxyl group;
   l represents an integer of 0 to 4; and
   each of m and n independently represents an integer of 2 to 1,000.

3. The polysiloxane-polycarbonate copolymer of claim 1, wherein n in chemical formula 1 is an integer of 11 to 40, and m in chemical formula 2 is an integer of 20 to 80.

4. The polysiloxane-polycarbonate copolymer of claim 1, wherein the polycarbonate block has a structure represented by the following chemical formula 3:

[Chemical formula 1]

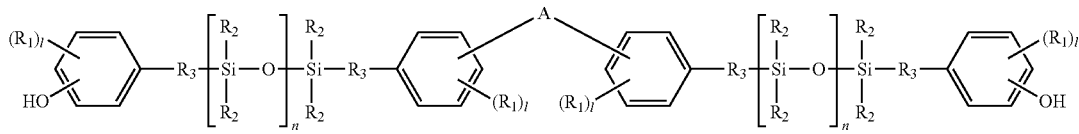

[Chemical formula 2]

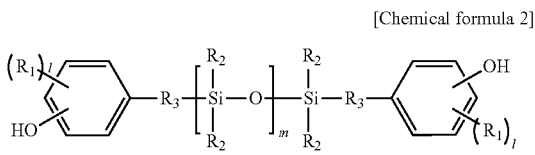

[Chemical formula 3]

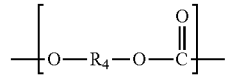

wherein: in the above chemical formulas 1 and 2, each $R_1$ independently represents hydrogen atom, halogen atom, hydroxy group, an alkyl group, an alkoxy group, or an aryl group;

each $R_2$ independently represents a hydrocarbon group having 1 to 13 carbon atoms, or hydroxy group;

each $R_3$ independently represents an alkylene group having 2 to 8 carbon atoms;

A represents a substituted or unsubstituted divalent hydrocarbon group comprising one or more groups selected from ester group, ether group, thioether group, ketone group or urethane group;

l represents an integer of 0 to 4; and each of m and n independently represents an integer of 2 to 1,000.

2. The polysiloxane-polycarbonate copolymer of claim 1, wherein: in chemical formulas 1 and 2, each $R_1$ independently represents hydrogen atom, halogen atom, hydroxy group, an alkyl group having 1 to 20 carbon atoms, an alkoxy group having 1 to 20 carbon atoms, or an aryl group having 6 to 20 carbon atoms;

each $R_2$ independently represents a hydrocarbon group having 1 to 13 carbon atoms, or hydroxy group;

each $R_3$ independently represents an alkylene group having 2 to 8 carbon atoms;

wherein: in the above chemical formula 3, $R_4$ represents an aromatic hydrocarbon group having 6 to 30 carbon atoms which is unsubstituted or substituted with alkyl group, cycloalkyl group, alkenyl group, alkoxy group, halogen atom or nitro group.

5. The polysiloxane-polycarbonate copolymer of claim 4, wherein the aromatic hydrocarbon group of $R_4$ in chemical formula 3 is derived from a compound of the following chemical formula 4:

[Chemical formula 4]

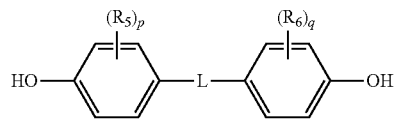

wherein: in the above chemical formula 4,

L represents a linear, branched or cyclic alkylene group having no functional group; or a linear, branched or cyclic alkylene group comprising at least one functional group selected from the group consisting of sulfide group, ether group, sulfoxide group, sulfone group, ketone group, naphthyl group or isobutylphenyl group, each of $R_5$ and $R_6$ independently represents halogen atom; or a linear, branched or cyclic alkyl group, and each of p and q independently represents an integer of 0 to 4.

6. The polysiloxane-polycarbonate copolymer of claim 1, wherein the sum of amounts of the hydroxyl-terminated polysiloxane of chemical formula 1 and the hydroxyl-terminated polysiloxane of chemical formula 2 is 3 to 39% by weight, based on the total weight of the polysiloxane-polycarbonate copolymer.

7. The polysiloxane-polycarbonate copolymer of claim 1, which has a viscosity average molecular weight of 13,000 to 69,000 g/mol.

8. A method for preparing a polysiloxane-polycarbonate copolymer, comprising the steps of:
(1) reacting a hydroxyl-terminated polysiloxane of the following chemical formula 1, a hydroxyl-terminated polysiloxane of the following chemical formula 2 and an oligomeric polycarbonate under an interfacial reaction condition to form a polysiloxane-polycarbonate intermediate; and
(2) polymerizing the polysiloxane-polycarbonate intermediate by using a first polymerization catalyst;
wherein total 100 parts by weight of the hydroxyl-terminated polysiloxanes of chemical formulas 1 and 2 consists of 1 to 39 parts by weight of the hydroxyl-terminated polysiloxane of chemical formula 1 and 61 to 99 parts by weight of the hydroxyl-terminated polysiloxane of chemical formula 2:

A represents a substituted or unsubstituted divalent hydrocarbon group comprising one or more groups selected from ester group, ether group, thioether group, ketone group or urethane group;
l represents an integer of 0 to 4; and
each of m and n independently represents an integer of 2 to 1,000.

9. The method for preparing a polysiloxane-polycarbonate copolymer of claim 8, wherein the step (1) of forming a polysiloxane-polycarbonate intermediate comprises a step of mixing a mixture of the hydroxyl-terminated polysiloxane of chemical formula 1 and the hydroxyl-terminated polysiloxane of chemical formula 2, and the oligomeric polycarbonate with a weight ratio of 3:97 to 39:61.

10. The method for preparing a polysiloxane-polycarbonate copolymer of claim 8, wherein the step (1) of forming a polysiloxane-polycarbonate intermediate comprises a step of forming a mixture comprising the hydroxyl-terminated polysiloxane of chemical formula 1, the hydroxyl-terminated polysiloxane of chemical formula 2 and the oligomeric polycarbonate; and the mixture further comprises a phase transfer catalyst, a molecular weight-controlling agent and a second polymerization catalyst.

11. The method for preparing a polysiloxane-polycarbonate copolymer of claim 8, wherein:

[Chemical formula 1]

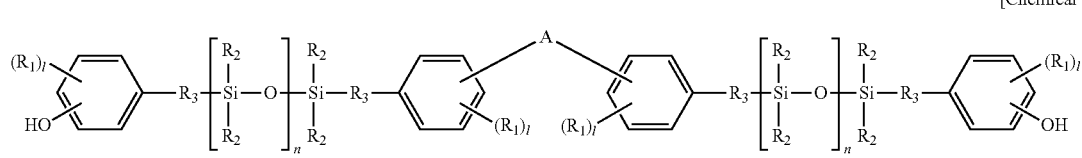

[Chemical formula 2]

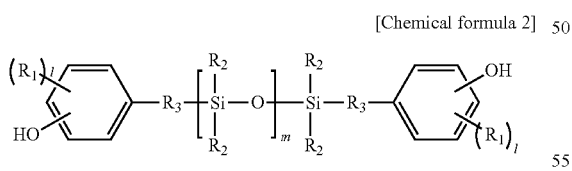

wherein: in the above chemical formulas 1 and 2, each $R_1$ independently represents hydrogen atom, halogen atom, hydroxy group, an alkyl group, an alkoxy group, or an aryl group;

each $R_2$ independently represents a hydrocarbon group having 1 to 13 carbon atoms, or hydroxy group;

each $R_3$ independently represents an alkylene group having 2 to 8 carbon atoms;

the step (1) of forming a polysiloxane-polycarbonate intermediate comprises a step of forming a mixture comprising the hydroxyl-terminated polysiloxane of chemical formula 1, the hydroxyl-terminated polysiloxane of chemical formula 2 and the oligomeric polycarbonate; and after completion of the reaction of the hydroxyl-terminated polysiloxanes of formulas 1 and 2 and the oligomeric polycarbonate, a step of extracting an organic phase from the resulting mixture, and the step (2) of polymerizing the polysiloxane-polycarbonate intermediate comprises a step of providing a first polymerization catalyst to the extracted organic phase.

12. The method for preparing a polysiloxane-polycarbonate copolymer of claim 8, wherein the oligomeric polycarbonate has a viscosity average molecular weight of 800 to 20,000 g/mol.

13. A molded article comprising the polysiloxane-polycarbonate copolymer according to claim 1.

\* \* \* \* \*